(12) United States Patent
Sundal (10) Patent No.: US 11,242,679 B2
(45) Date of Patent: Feb. 8, 2022

(54) FRAME STRUCTURE FOR A FLOATING INSTALLATION

(71) Applicant: Flexible Floating System AS, Randaberg (NO)

(72) Inventor: Einar Tommy Sundal, Randaberg (NO)

(73) Assignee: Flexible Floating System AS, Randaberg (NO)

( * ) Notice: Subject to any disclaimer, the term of this patent is extended or adjusted under 35 U.S.C. 154(b) by 369 days.

(21) Appl. No.: 16/482,368

(22) PCT Filed: Jan. 23, 2018

(86) PCT No.: PCT/NO2018/050014
§ 371 (c)(1),
(2) Date: Jul. 31, 2019

(87) PCT Pub. No.: WO2018/143818
PCT Pub. Date: Aug. 9, 2018

(65) Prior Publication Data
US 2021/0285204 A1    Sep. 16, 2021

(30) Foreign Application Priority Data

Feb. 2, 2017 (NO) .................................. 20170163

(51) Int. Cl.
*E04B 1/19* (2006.01)
*F03D 13/25* (2016.01)
*B63B 35/44* (2006.01)

(52) U.S. Cl.
CPC ............... *E04B 1/19* (2013.01); *B63B 35/44* (2013.01); *F03D 13/25* (2016.05);
(Continued)

(58) Field of Classification Search
CPC . E04B 1/19; F03D 13/25; B63B 35/44; B63B 35/4413; B63B 2035/446; B63B 2035/473
See application file for complete search history.

(56) References Cited

U.S. PATENT DOCUMENTS

| 2,474,529 A * | 6/1949 | Hullinger | F16D 3/38 |
| | | | 464/112 |
| 4,037,278 A * | 7/1977 | Dotti | F16C 11/00 |
| | | | 441/21 |
| 2021/0285204 A1* | 9/2021 | Sundal | F03D 13/25 |

FOREIGN PATENT DOCUMENTS

| CN | 102506012 A | 6/2012 |
| CN | 104058073 A | 9/2014 |

(Continued)

OTHER PUBLICATIONS

Norwegian Search Report, NO20170163, dated Sep. 2, 2017.
(Continued)

*Primary Examiner* — S. Joseph Morano
*Assistant Examiner* — Jovon E Hayes
(74) *Attorney, Agent, or Firm* — Andrus Intellectual Property Law, LLP (57) ABSTRACT

A floatable frame structure has concatenated frame modules, each formed of columns arranged substantially vertically. Neighboring columns are interconnected by upper and lower tie bars and form module sections. The connections between the tie bars and columns have rotary joints arranged at upper and lower nodes on the columns. At least one horizontal rotation joint is arranged for each column in the connection to an associated tie bar, and at least one spherical rotary joint or elastic rotary joint is arranged for each tie bar. Each module section is provided with elastic tensile elements secured to diagonally opposite upper and lower nodes, nodes lying diagonally opposite each other in the same horizontal (Continued)

plane and in the same frame module being connected by elastic tensile elements. Some columns form containers with submersible portions with positive buoyancy, and adjacent frame modules sharing at least one column.

12 Claims, 7 Drawing Sheets

(52) U.S. Cl.
CPC ..... *B63B 35/4413* (2013.01); *B63B 2035/446* (2013.01); *B63B 2035/4473* (2013.01)

(56) References Cited

FOREIGN PATENT DOCUMENTS

| EP | 0210776 A2 * | 2/1987 | ............... E04B 1/19 |
|----|--------------|--------|---------------------------|
| EP | 0210776 A2 | 2/1987 | |
| WO | 1987/03170 | 6/1987 | |
| WO | 2012098564 | 7/2012 | |
| WO | WO-2012098564 A1 * | 7/2012 | ............. A01G 33/00 |

OTHER PUBLICATIONS

International Search Report, PCT/NO2018/050014, dated Mar. 23, 2018.

Written Opinion of the International Searching Authority, PCT/NO2018/050014, dated Mar. 23, 2018.

* cited by examiner

FRAME STRUCTURE FOR A FLOATING INSTALLATION

CROSS-REFERENCE TO RELATED APPLICATIONS

This application is the U.S. national stage application of International Application PCT/NO2018/050014, filed Jan. 23, 2018, which international application was published on Aug. 9, 2018, as International Publication WO 2018/143818 in the English language. The International Application claims priority of Norwegian Patent Application No. 20170163, filed Feb. 2, 2017. The international application and Norwegian application are both incorporated herein by reference, in entirety.

FIELD

A floatable frame structure which is formed of several concatenated frame modules is described.

BACKGROUND

Floating installations that are placed in open waters at sea are subjected to great strains, not least when the size of the installations makes it necessary to give the buoyancy bodies in the form of hulls or other floating bodies large ground areas and large volumes and thereby large surfaces that are affected by motions of the water masses. The size makes both constructing and moving to a location at sea demanding and costly. A rigid hull is subjected to great strains in rough sea.

On the other hand, a large horizontal extent of the installation may be an advantage. By letting an installation, such as an offshore wind turbine, have an associated helicopter pad, the access to the installation will, as a rule, be easier and less affected by the weather conditions than access that is based on the use of a boat.

From CN102506012A a hexagonal supporting structure for a semi-submersible wind turbine facility is known, in which each wind turbine is mounted on a buoyancy body with a cylindrical cross section. Each buoyancy body is anchored, and the buoyancy bodies are interconnected by lattice girders that are below the water surface.

CN104058073A discloses a semi-submersible wind turbine facility made up of triangular modules, wherein, at each node, there is a buoyancy body supporting a wind turbine. The buoyancy bodies are anchored and are interconnected by lattice girders that are supported by a further buoyancy body in a middle portion. The lattice girders are above the water surface.

WO8703170A1 discloses a floating farming facility for fish, in which a seine is suspended in a cage formed of bracing rods that are interconnected at a node. Vertical bracing rods are provided with buoyancy bodies. Some of the nodes are interconnected by diagonal braces.

From WO2012098564A1 a farming facility for fish is known, in which a framework comprises several elongated elements interconnected at nodes, the elements and the nodes forming repeating triangles. Each of the elongated elements is independently rotatable in the horizontal plane and the vertical plane around a node.

U.S. Pat. No. 2,474,529A discloses a spherical rotary joint which allows a certain lateral movement, while, at the same time, it is rotatable around two different axes, but can transmit torque around a third axis.

SUMMARY

The invention has for its object to remedy or to reduce at least one of the drawbacks of the prior art or at least provide a useful alternative to the prior art.

The object is achieved through the features that are specified in the description below and in the claims that follow.

The invention provides a floatable frame structure made up of several concatenated frame modules. Each frame module is formed as a lattice cube, in which four vertical columns are interconnected by upper and lower tie bars. Adjacent frame modules share one or more columns. Thereby a floatable, flexible frame structure which has a large horizontal extent, but still with small surfaces that are affected by motions of the water masses, is provided.

At least some of the tie bars may form walkways, cable trays, etc. between the columns and are preferably formed as a lattice structure.

Nodes between the tie bars and the columns are formed as rotary joints of two different types: a) horizontal rotary joint, that is to say a rotary joint having an axis of rotation that is perpendicular to a plane through the centre axis of the column and can transmit a torque around the longitudinal axis of the tie bar; and b) spherical joint (ball joint, pivot-bearing joint, rod-end bearing), that is to say a rotary joint that can allow free rotation of the tie bar within the limits of the joint without substantially transmitting a torque to the connected element. The different rotary joints are distributed according to the following principle:

Each column is provided with at least one horizontal-rotation joint to prevent the column from rotating around its own centre axis.

Each tie bar is provided with at least one spherical rotary joint forming a connection to an associated column and being arranged to be rotated from a centre position in all directions through an angle which is appropriately a maximum of ±6° from a centre position.

The spherical rotary joint suitably includes a spherical bearing arranged on a joint axle having a centre axis arranged in a plane which is perpendicular to the centre axis of the column and being attached to the column. A joint sleeve surrounding the spherical bearing is fixed via a surrounding ring to an end portion of the tie bar. The ring is arranged in the centre plane of the spherical bearing. Fixed to the column and concentric with the joint axle, two supporting sleeves arranged symmetrically project inwards towards the ring, forming stop faces for the ring with their inward-facing end faces. The stop faces are preferably provided with a low-friction coating, at least in a lower sector and an upper sector. Between the supporting sleeves and the joint sleeve, elastic packing rings are preferably arranged.

Nodes located diagonally opposite each other and in the same plane in the cube are interconnected by an elongated, elastic tensile element, typically in the form of a steel rope.

Some columns form buoyancy bodies as lower portions of the columns themselves are formed as containers with submersible volumes. Some columns may be provided with one or more submersible floating bodies, and/or the lower portions of the columns may be formed with larger cross sections than the rest of the columns.

Each frame module forms part of a latticework that can "live", that is to say alter its shape, when the frame structures are floating and are affected by varying load, wind and wave stresses. This is made possible by said rotary-joint connections between the tie bars and the columns. The different rotary joints are arranged in a system that keeps the columns substantially parallel while, at the same time, each column can move in a vertical direction only restricted by the elasticity of the diagonal tensile elements.

Two neighbouring columns interconnected by upper and lower tie bars via rotary joints form a module section. Extending diagonally between an upper node on one column and a lower node on the opposite column, there is an elastic tensile element. Each column constitutes part of two adjacent module sections. The rotary joints, four altogether, of a module section have been chosen on the basis of the criteria given above and make it possible for a column to be displaced in a vertical direction while the columns are kept parallel at the same time. The individual vertical displacement of the columns results in the horizontal distance between neighbouring columns varying. The horizontal distance between diagonally opposite columns may also vary within the restrictions set by the elasticity of the tensile elements lying horizontally in the frame module.

The frame structure may comprise one or more columns that form towers for carrying wind turbines. The dimensions of the columns are adapted for the load to be carried, as concerns both strength, height, cross section and buoyancy.

At least some of the columns may be provided with means for ballasting, typically in the form of pump and pipe systems for filling and evacuating one or more ballast tanks arranged in the column, preferably in the lower portion of the column.

To reduce the vertical displacement of the columns when influenced by waves in the water masses, it may be an advantage to provide the columns with heave stabilizers in the form of one or more plate elements projecting substantially radially from the columns.

The frame structure may be provided with a number of installations that are used in the operation of devices carried by the frame structure, such as a helicopter landing platform, anchor-handling plants, machinery housing, frequency converters, electric transformers, electric accumulators, storage rooms for materials used in connection with the activity associated with the frame structure and so on. It is an advantage if, in terms of load, the installation is arranged in a centred manner on a column forming a buoyancy body.

The invention is defined by the independent claim. The dependent claims define advantageous embodiments of the invention.

The invention relates, more specifically, to a floatable frame structure formed of several concatenated frame modules, in which
  the frame module is formed of four columns arranged substantially vertically, four upper tie bars and four lower tie bars, and
  neighbouring columns are interconnected in pairs by an upper tie bar and a lower tie bar and form module sections, characterized by
  the connections between the tie bars and the columns being formed of rotary joints arranged in upper and lower nodes on the columns,
    there being at least one horizontal-rotation joint arranged for each column in the connection to an associated tie bar, and
    there being at least one spherical rotary joint or elastic rotary joint arranged for each tie bar in the connection to an associated column,
  each module section being provided with elastic tensile elements that are secured to diagonally opposite upper and lower nodes,
  nodes lying diagonally opposite each other in the same horizontal plane and in the same frame module being connected by elastic tensile elements,
  at least some columns forming a container with a submersible volume with positive buoyancy, and
  adjacent frame modules sharing at least one column.

At least some of the tie bars may form walkways.

At least some of the tie bars may form trays arranged for the extension of power, signal and/or fluid lines.

Lower portions of at least some of the columns may have expanded cross sections.

At least some of the columns may be provided with ballasting systems. The draught of the frame structure in the sea may thereby be adjusted and adapted for the load carried at any time.

At least some of the columns may be provided with at least one heave stabilizer. The at least one heave stabilizer may be formed as a plate element projecting substantially radially from the column.

The elastic rotary joint may include a joint pin which projects from an end portion of a tie bar, through a cut-out in a plate element fixed to the column and is clamped to the plate element by elastic supporting elements, which are axially displaceable on the joint pin, resting supportingly against the plate element.

A tie bar provided with spherical rotary joints or flexible rotary joints may be rotatable around a longitudinal axis in a sector of at least $\pm 6°$ from a centre position. It is an advantage if the elasticity of the tensile elements is adapted for the expected wind and wave loads so that the spherical rotary joints will not reach their maximum extreme positions.

The elastic tensile elements may be formed of steel ropes or synthetic-fibre ropes.

At least one of the frame modules may be provided with a wind turbine arranged on one of the columns. A production facility which is installed on the frame structure, for example a fish-farming net pen may then be self-sufficient in electrical energy.

The frame module may have a square ground plan. The number of components necessary for building a frame structure may thereby be reduced to a minimum.

BRIEF DESCRIPTION OF THE DRAWINGS

In what follows, examples of preferred embodiments are described, which are visualized in the accompanying drawings, in which.

DETAILED DESCRIPTION OF THE DRAWINGS

Figure 2:
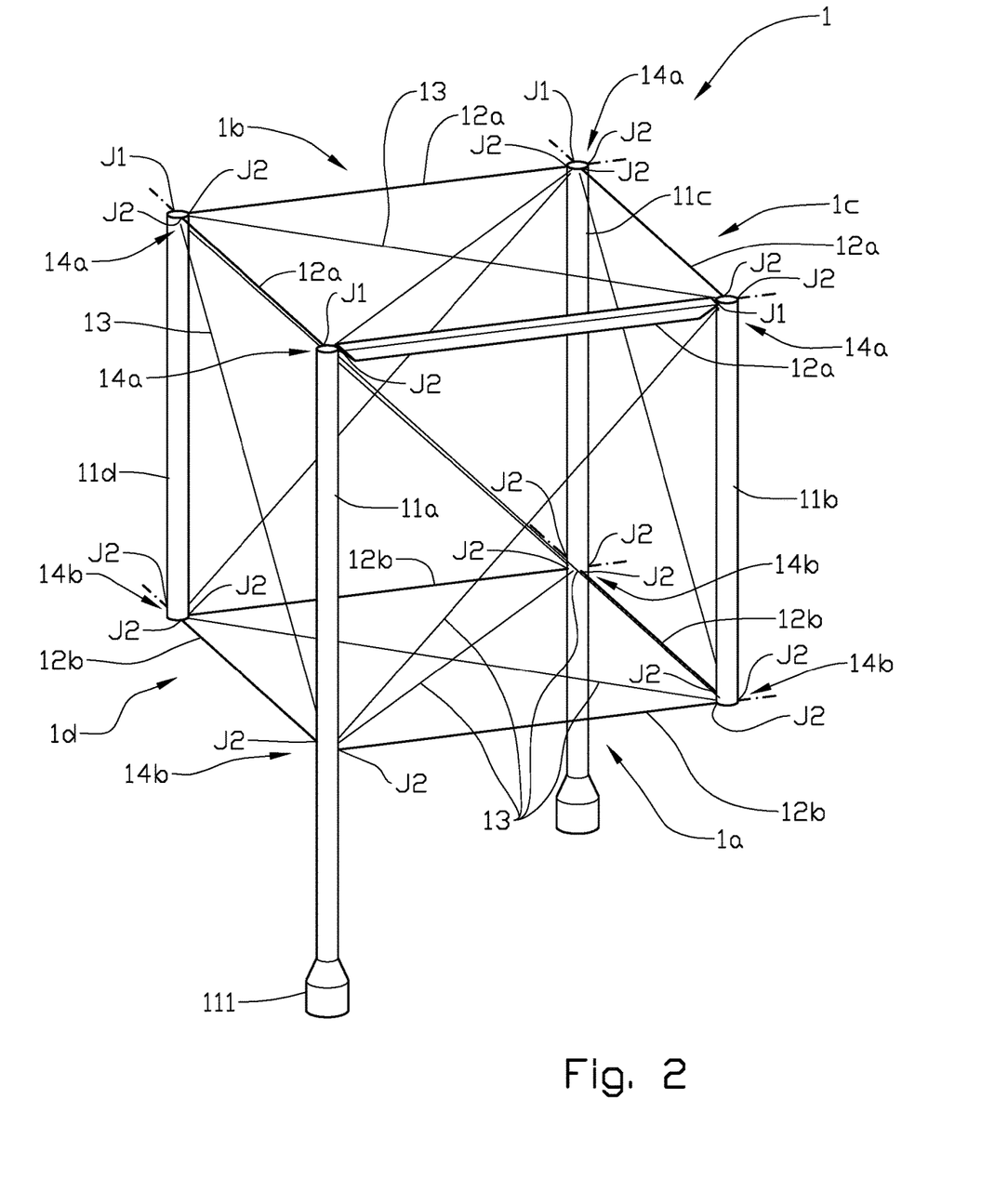
FIG. 2 shows a principle drawing, on a larger scale, of a frame module with indications of tie bars belonging to two adjacent frame modules.

Reference is first made to FIG. 2. A frame module 1 is formed as a cubiform lattice structure, in which four columns 11a, 11b, 11c 11d are each connected to the nearest columns by means of mutually parallel upper tie bars 12a and lower tie bars 12b at upper and lower nodes 14a, 14b, respectively. The tie bars 12a, 12b are connected to the respective columns 11a, 11b, 11c, 11d by means of horizontal-rotation joints J1 or spherical rotary joints J2 (also known as pivot-bearing joints or rod-end-bearing joints) in a system which is described in detail in what follows. A pair of columns 11a, 11b; 11b, 11c; 11c, 11d; 11d, 11a and upper and lower tie bars 12a, 12b form a module section 1a, 1b, 1c, 1d. Adjacent module sections share one column. Upper and diagonally opposite lower nodes 14a, 14b of each module section 1a, 1b, 1c, 1d are connected by an elastic tensile element 13, for example a steel rope. Correspondingly, the upper nodes 14a of the diagonally opposite columns 11a, 11c; 11b, 11d are connected by a corresponding elastic tensile element 13, and so are the diagonally opposite lower nodes 14b. Tie bars belonging to adjacent module sections not shown are shown by dash-dot lines.

To prevent the columns 11a, 11b, 11c, 11d from rotating around their own centre axes, each column is connected to at least one tie bar 12a, 12b via a horizontal-rotation joint J1, that is to say a rotary joint which can only rotate around a horizontal axis of rotation. In FIG. 2, horizontal-rotation joints J1 are arranged in the upper nodes 14a of the columns 11a, 11b, 11c, 11d.

In the remaining jointed connections between the tie bars 12a, 12b and the columns 11a, 11b, 11c, 11d, spherical rotary joints J2 are used, that is to say joints which, within certain limits, can rotate freely in all directions. In FIG. 2, spherical rotary joints J2 are used in all the lower nodes 14b. A spherical rotary joint J2 typically allows a rotation of the tie bar 12a, 12b around the longitudinal axis thereof of ±6° from the centre position of the spherical rotary joint J2. When the spherical rotary joints J2 lie above the centres of gravity of the tie bars 12a, 12b, the tie bars 12a, 12b will take a neutral position unless external loads, for example waves and wind, cause a torque in the tie bars 12a, 12 around their longitudinal axes of rotation.

In an operative state, lower portions 111 of some of the columns, two columns 11a, 11c shown here, are submerged and form containers providing positive buoyancy. Said columns 11a, 11c are shown here with lower portions 111 with expanded cross sections for providing greater buoyancy.

Figure 4:
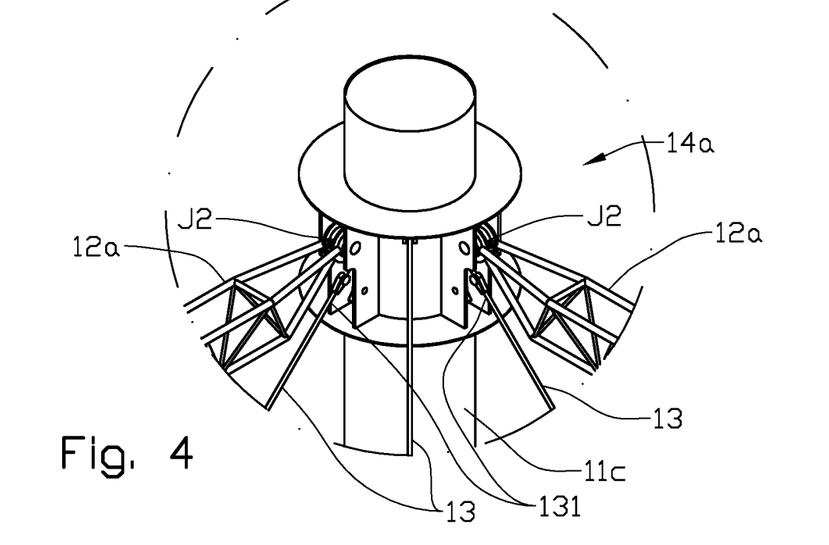
FIG. 4 shows a first section of FIG. 3, in which an upper node with a spherical rotary joint that forms connections between tie bars and a column, and the attachment for diagonal tensile elements are shown on a larger scale.
Figure 5:
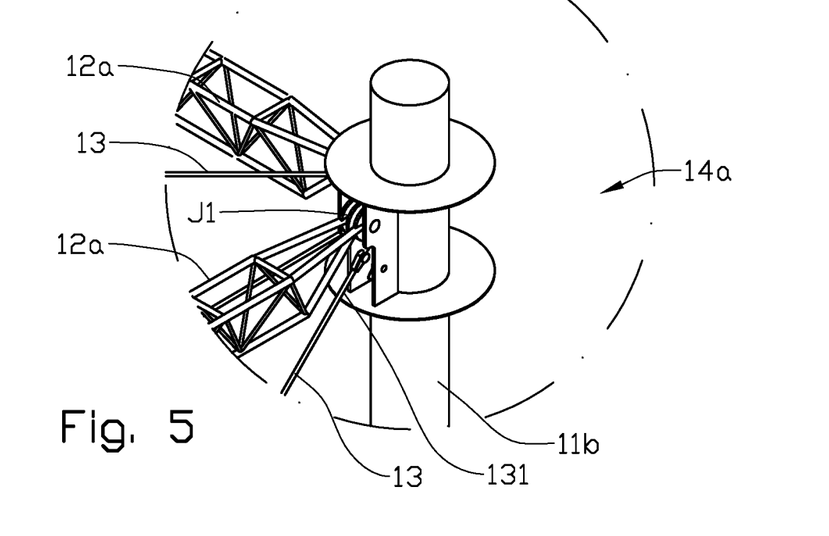
FIG. 5 shows a second section of FIG. 3 in which an upper node with a horizontal rotary joint is shown.
Figure 6:
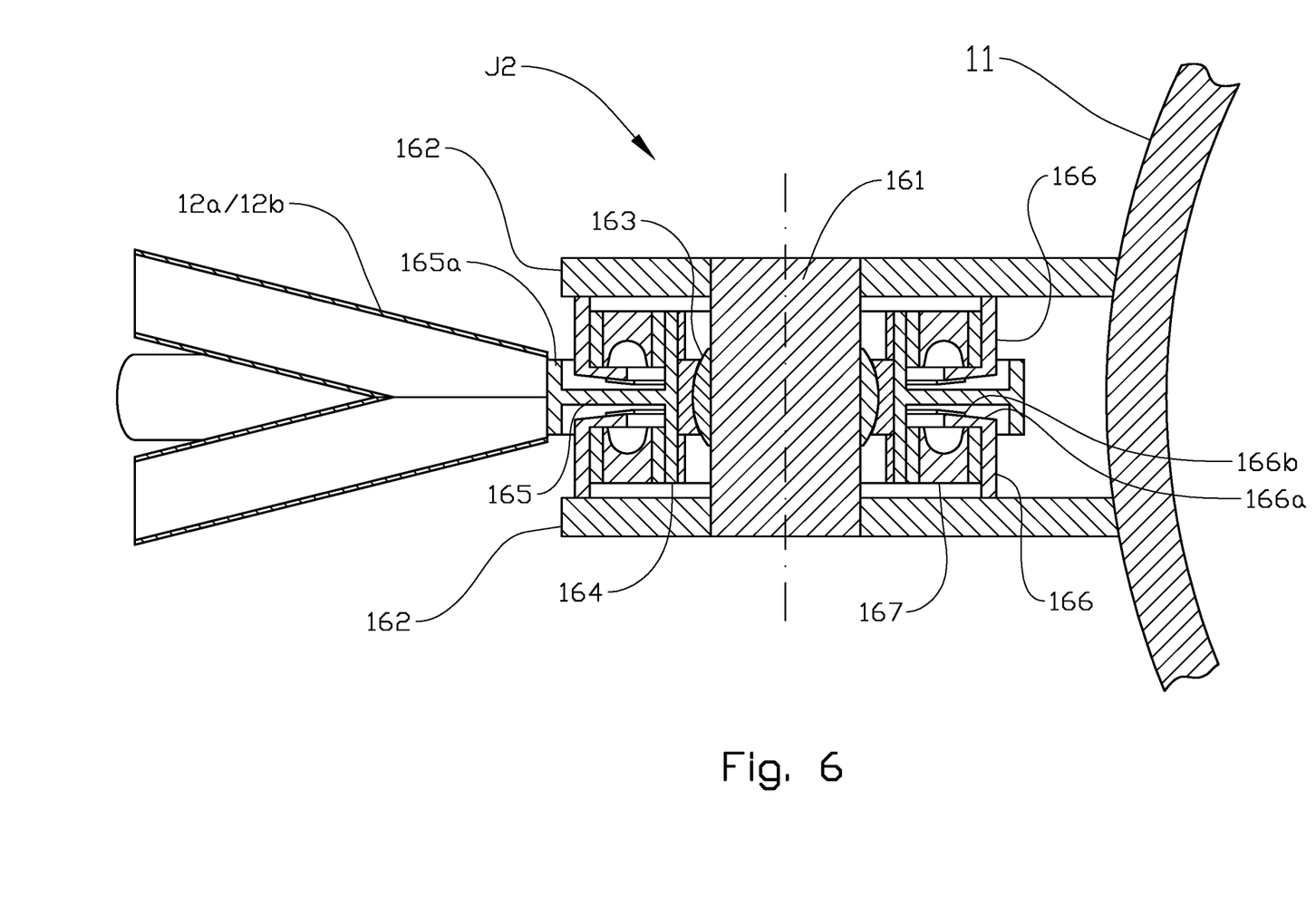
FIG. 6 shows a horizontal axial section, on a larger scale, through a spherical rotary joint.

The different joints J1, J2 are shown in greater detail in FIGS. 4, 5 and 6. In FIGS. 4 and 5 it is also shown how end portions 131 of the elastic tensile elements 13 are secured to an upper node 14a on a column 11.

Reference is now made to FIG. 6, in which an embodiment of the spherical rotary joint J2 is shown. A joint axle 161 is fixed, by means of two brackets 162, at a distance from the periphery of a column 11 with a longitudinal axis in a plane perpendicular to the longitudinal axis of the column and perpendicular to the longitudinal axis of the tie bar 12a, 12b. A spherical bearing 163 is arranged on the joint axle 161, here shown centred on the joint axle 161 and in a neutral position. A joint sleeve 164 surrounds the spherical bearing 163. A ring 165 surrounds the joint sleeve 164. An annular flange 165a forms the periphery of the ring 165. The ring 165 is attached to the tie bar 12a, 12b. Two supporting sleeves 166 are arranged concentrically with the joint axle 161, are fixed to respective brackets 162 and extend towards the ring 165, the end portions 166a of the supporting sleeves 166 forming abutment surfaces 166a restricting the sideways rotation of the spherical rotary joint J2 from the centre position thereof, by the ring 165 in the extreme position of the rotary joint J2 hitting the abutment surfaces 166a. The end portions 166a of the supporting sleeves 166 are shown here as conical and projecting to provide a sufficiently large abutment surface. A low-friction coating 166b has been applied, to at least parts of the abutment surface 166a, typically in an upper sector and a lower sector, to limit the friction in the rotary joint J2 when it is in its extreme position. The spherical rotary joint J2 typically allows a rotation of the tie bar 12a, 12b around the longitudinal axis thereof of up to ±6° from the centre position of the spherical rotary joint J2. Flexible packing rings 167 are arranged in the annular space between the supporting sleeves 166 and the joint sleeve 164.

Figure 7:
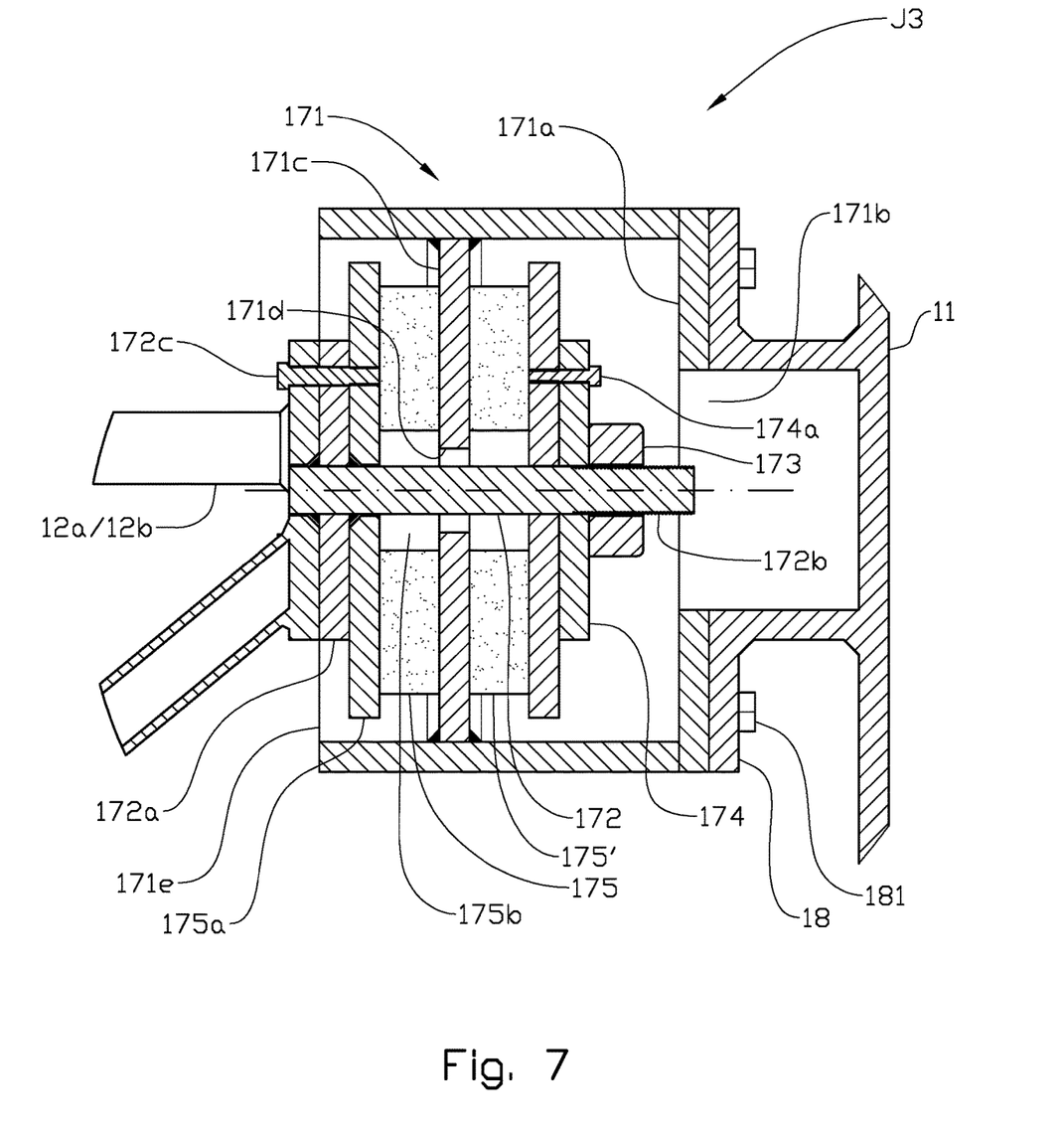
FIG. 7 shows a vertical section through a flexible joint.

An alternative exemplary embodiment of a connection element is shown in FIG. 7 in the form of a flexible joint J3 (also referred to as a flexi-joint in what follows) forming a connection between a column 11 and the upper or lower tie bar 12a, 12b. A plate element 171c provided with a first cut-out 171d is fixed at a distance from the column 11, the plate element 171c forming a partition wall in a joint housing 171 which, via an end wall 171a, forms an abutment surface against a joint mounting 18 formed on the column 11. The joint housing 171 is attached to the joint mounting 18 by means of several first attachment bolts 181.

The plate element 171c is arranged parallel to the end wall 171a and fixed approximately in the middle of the joint housing 171. A through cut-out 171d is arranged in the middle portion of the plate element 171c.

Elastic supporting elements 175, 175' are arranged on each side of the plate element 171c. In an end portion facing away from the plate element 171c, each supporting element 715, 175' is provided with a supporting plate 175a, 175a', respectively, typically in the form of a metal plate, to which the elastic material of the supporting element 175, 175' is attached, for example by gluing or vulcanizing. Each supporting element 175, 175' is provided with a centre opening 175b.

An open end portion 171d of the joint housing 171 faces an end portion of the tie bar 12a, 12b where a joint pin 172 provided with an attachment flange 172a, is attached to the tie bar 12a, 12b by means of several second attachment bolts 172c and projects into the joint housing 171 through cut-outs 171d, 171b in the plate element 171c and the end wall 171a of the joint housing 171, respectively, and through the centre openings 175b of the supporting elements 175, 175'. A nut 173 engages with a threaded portion 172b of the joint pin 172. A washer 174 which is arranged between the nut 173 and the nearest elastic supporting element 175' is attached to the supporting plate 175a' of the elastic supporting element 175' by means of several third attachment bolts 174a. By the nut 173 being screwed onto the threaded portion 172b of the joint pin 172, the elastic supporting elements 175, 175' are pressed against the plate element 171c. Because of the elasticity of the supporting elements 175, 175' and the clearance between the joint pin 172 and the cut-out 171b of the plate element 171c, the joint pin 172, and thereby the tie bar 12a, 12b to which the joint pin 172 is attached, may take a direction that deviates from the perpendicular to the plate element 171c. The torsion is dampened by the rigidity of the elastic supporting elements 175, 175'.

The flexible joint J3 may replace the spherical rotary joint J2, especially where a certain twisting of the tie bars 12a, 12b around their longitudinal axes does not affect the supporting functions of the tie bars 12a, 12b, and in all circumstances in which environmental conditions etc. make extra strict demands on the function and durability of the joints, for example when affected by sea water.

Figure 1:
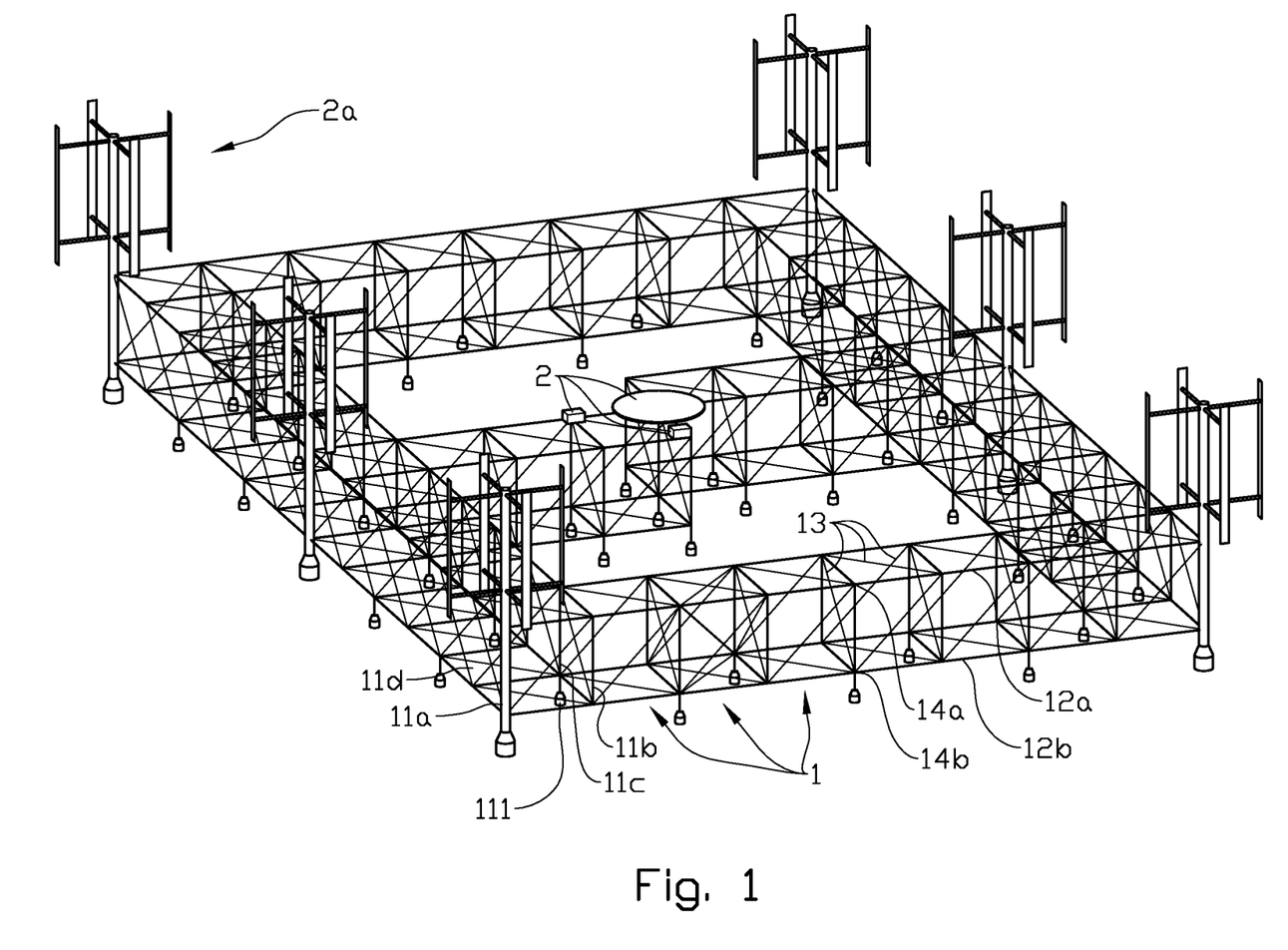
FIG. 1 shows a principle drawing in perspective of a frame structure according to the invention provided with several wind turbines with vertical axes of rotation, in which, for the sake of exposure, only one frame module of the front part of the frame structure is shown with a complete number of diagonal tensile elements.

In FIG. 1, several installations 2 arranged on the frame structure are shown, here shown schematically as a house and a helicopter landing platform. In addition, several wind turbines 2a are arranged on extended columns 11a distributed over the periphery of the frame structure. For the sake of exposition, not all of the tensile elements 13 are shown.

Figure 3:
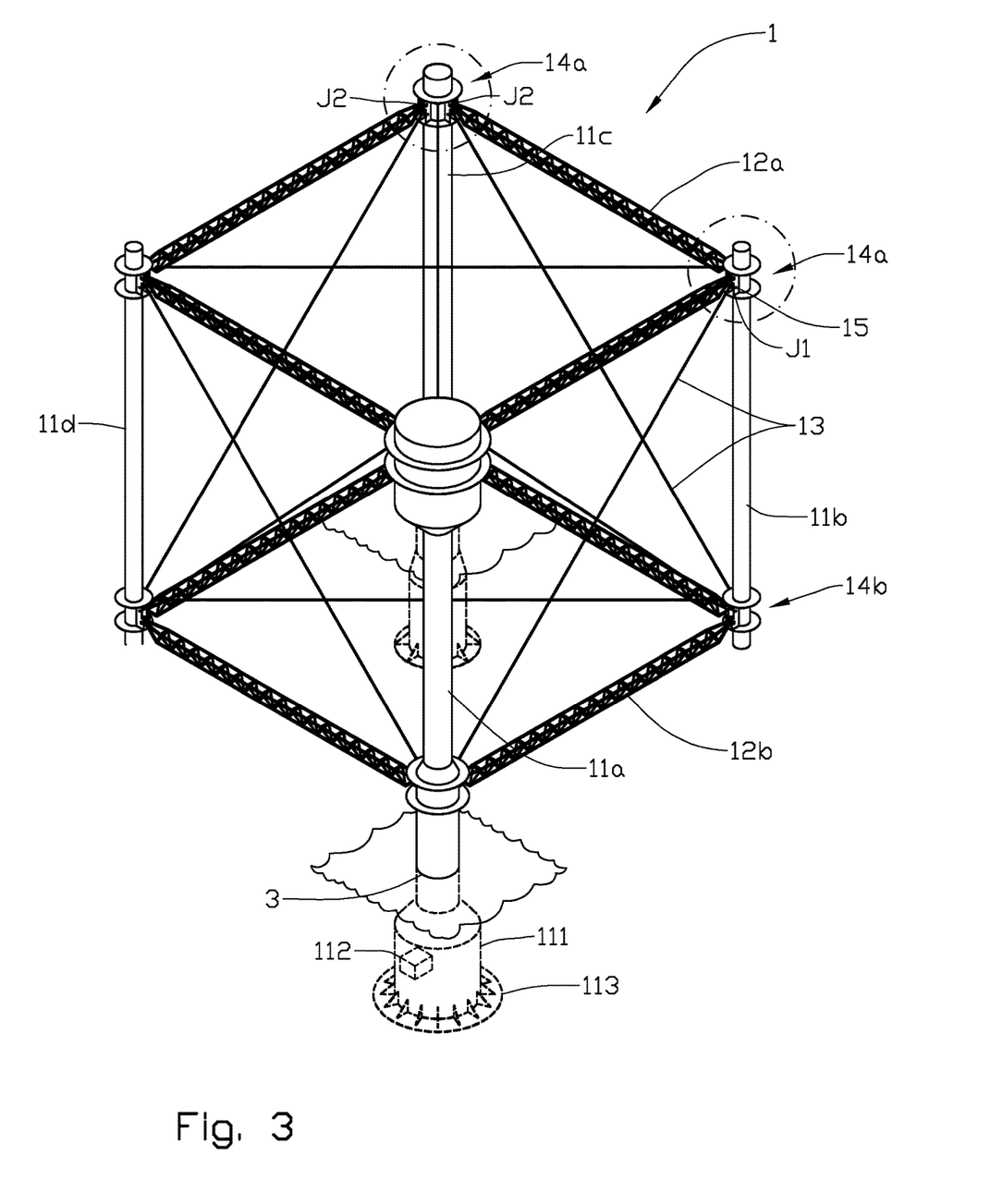
FIG. 3 shows a frame module with tie bars formed as lattice structures, and two columns provided with heave stabilizers projecting from a submerged column portion.

In FIG. 3, a water line 3 is indicated on the column 11a. The water line 3 is typically about 4 metres below the lower tie bars 12b.

In FIG. 3, a ballasting system 112 arranged in the column 11a is shown schematically.

Figure 8:
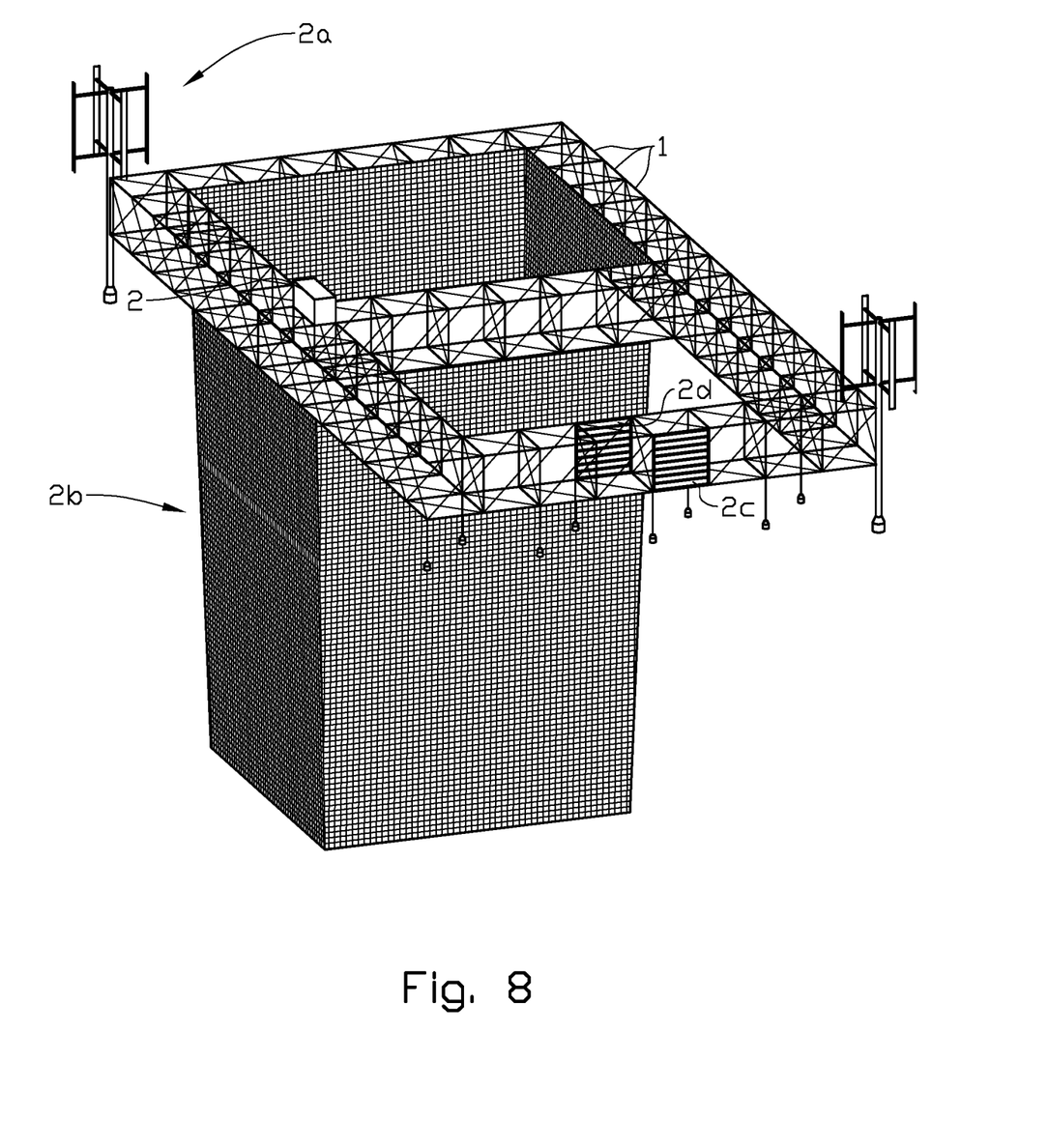
FIG. 8 shows, on a smaller scale, a frame structure provided with a fish-farming net pen.

In FIG. 8, an embodiment of the frame structure carrying a fish-farming net pen 2b, an installation 2 in the form of a service building and two wind turbines 2a is shown. In this embodiment, it is an advantage that the frame module 1 is provided with external, possibly also internal, breakwaters 2c, 2d. In FIG. 8, for the sake of exposition, only one frame module 1 is provided with an external breakwater 2c and one frame module 1 is provided with an internal breakwater 2d. For the sake of exposition, only some of the columns are shown as buoyancy bodies. In this embodiment, the frame structure is floating deeper than has been mentioned earlier.

In a frame structure of this type, it is also obvious to install elements (not shown) that make it possible to moor vessels and transfer personnel and load between the vessels and the frame structure.

It should be noted that all the above-mentioned embodiments illustrate the invention, but do not limit it, and persons skilled in the art may construct many alternative embodiments without departing from the scope of the attached claims. In the claims, reference numbers in brackets are not to be regarded as restrictive.

The use of the verb "to comprise" and its different forms does not exclude the presence of elements or steps that are not mentioned in the claims. The indefinite article "a" or "an" before an element does not exclude the presence of several such elements.

The fact that some features are indicated in mutually different dependent claims does not indicate that a combination of these features cannot be used with advantage.

The invention claimed is:

1. A floatable frame structure formed of several concatenated frame modules, wherein the frame module is formed of four columns arranged substantially vertically, four upper tie bars and four lower tie bars; and neighboring columns are interconnected in pairs by upper and lower tie bars and form module sections, wherein the connections between the tie bars and the columns are formed of rotary joints arranged in upper and lower nodes on the columns;

there being at least one horizontal rotation joint arranged for each column in the connection to an associated tie bar; and there being at least one spherical rotary joint or elastic rotary joint arranged for each tie bar in the connection to an associated column;

each module section is provided with elastic tensile elements which are secured to diagonally opposite upper and lower nodes;

nodes lying diagonally opposite each other in the same horizontal plane and in the same frame module are connected by elastic tensile elements;

at least some columns form containers with a submersible portion with positive buoyancy; and adjacent frame modules share at least one column.

2. The floatable frame structure according to claim 1, wherein at least some of the tie bars form walkways.

3. The floatable frame structure according to claim 1, wherein at least some of the tie bars form trays arranged for the extension of power, signal and/or fluid lines.

4. The floatable frame structure according to claim 1, wherein a lower portion of at least some of the columns have expanded cross sections.

5. The floatable frame structure according to claim 1, wherein at least some of the columns are provided with ballasting systems.

6. The floatable frame structure according to claim 1, wherein at least some of the columns are provided with at least one heave stabilizer each.

7. The floatable frame structure according to claim 6, wherein the at least one heave stabilizer is formed as a plate element projecting substantially radially from the column.

8. The floatable frame structure according to claim 1, wherein the elastic rotary joint includes a joint pin projecting from an end portion of a tie bar, through a cutout in a plate element, which is fixed to the column, and is clamped to the plate element by elastic supporting elements, which are axially displaceable on the joint pin, resting supportingly against the plate element.

9. The floatable frame structure according to claim 1, wherein a tie bar which is provided with spherical rotary joints or flexible rotary joints is rotatable around a longitudinal axis over a sector of ±6° maximum from a center position.

10. The floatable frame structure according to claim 1, wherein the elastic tensile elements are formed of steel ropes or synthetic fiber ropes.

11. The floatable frame structure according to claim 1, wherein at least one of the frame modules is provided with a wind turbine arranged on one of the columns.

12. The floatable frame structure according to claim 1, wherein the frame module has a square ground plan.

* * * * *